US012775230B2

(12) United States Patent
Nishimura et al.

(10) Patent No.: US 12,775,230 B2
(45) Date of Patent: Oct. 27, 2026

(54) IMAGE FORMING APPARATUS INCLUDING A RETRACTABLE GUIDE MEMBER

(71) Applicant: CANON KABUSHIKI KAISHA, Tokyo (JP)

(72) Inventors: Shizuma Nishimura, Shizuoka (JP); Tomooku Koyama, Shizuoka (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 19/091,150

(22) Filed: Mar. 26, 2025

(65) Prior Publication Data

US 2025/0306509 A1 Oct. 2, 2025

(30) Foreign Application Priority Data

Mar. 28, 2024 (JP) ................................ 2024-053305

(51) Int. Cl.
*G03G 15/20* (2006.01)
*G03G 21/16* (2006.01)

(52) U.S. Cl.
CPC ..... *G03G 15/2035* (2013.01); *G03G 15/2028* (2013.01); *G03G 21/1685* (2013.01); *G03G 2221/1639* (2013.01); *G03G 2221/1675* (2013.01)

(58) Field of Classification Search
CPC ........... G03G 15/2028; G03G 15/2035; G03G 21/1685; G03G 2221/1639; G03G 2221/1675
See application file for complete search history.

(56) References Cited

U.S. PATENT DOCUMENTS

2025/0291285 A1* 9/2025 Ohta .................. G03G 15/2035
2025/0291286 A1* 9/2025 Obata ................ G03G 15/2035

FOREIGN PATENT DOCUMENTS

| | | | |
|---|---|---|---|
| JP | H06317998 | A | 11/1994 |
| JP | 2007292959 | A | 11/2007 |
| JP | 2020118812 | A | 8/2020 |
| JP | 2023109159 | A | 8/2023 |

* cited by examiner

*Primary Examiner* — Sophia S Chen
(74) *Attorney, Agent, or Firm* — Canon U.S.A., Inc. IP Divsion

(57) ABSTRACT

An image forming apparatus includes an image forming unit, a fixing unit, and a supporting device, wherein, when the fixing unit is at a first position, a moving member is positioned closer to a first rotation member than a virtual line connecting an end portion of a fixing nip portion where a recording medium enters and an end portion of the guide member on an upstream side in a recording medium conveyance direction when viewed in a rotation axis direction, and wherein, when the fixing unit is at a second position, the moving member is positioned such that at least one portion of the moving member is projecting toward a second rotation member relative to the virtual line.

5 Claims, 11 Drawing Sheets

IMAGE FORMING APPARATUS INCLUDING A RETRACTABLE GUIDE MEMBER

BACKGROUND

Field

The present disclosure relates to a toner image forming apparatus that forms a toner image on a recording medium by employing an electrophotographic recording technique.

Description of the Related Art

In toner image forming apparatuses such as printers, copiers, and multifunctional peripherals employing electrophotographic techniques, a fixing unit for fixing a toner image formed on a recording medium onto the recording medium is disposed. It is considered that movement of the fixing unit from a first position used at the time of printing to a second position facilitates replacement of the fixing unit with respect to a body of the image forming apparatus.

However, there may be a case where the fixing unit is moved to the second position with a recording medium jammed in the fixing unit to clear the jammed recording medium. In such a case, it is conceivable that unfixed toner on the recording medium may come into contact with a guide member that guides the recording medium, and the guide member may be soiled with the unfixed toner. Consequently, if the fixing unit is moved back to the first position with the guide member being soiled with the toner and the printing is resumed, a next recording medium is soiled with the toner adhering to the guide member.

SUMMARY

The present disclosure is directed to prevention of a guide member from being soiled with toner when a jammed recording medium is cleared.

According to some embodiments, an image forming apparatus includes an image forming unit including a transfer portion in which an unfixed toner image is transferred to a recording medium, a fixing unit configured to fix the unfixed toner image formed on the recording medium onto the recording medium at a fixing nip portion, the fixing unit including a first rotation member that comes into contact with the unfixed toner image formed on the recording medium, a second rotation member that comes into contact with an outer circumference of the first rotation member to form the fixing nip portion between the first rotation member and the second rotation member, and a guide member disposed closer to the first rotation member than the second rotation member when viewed in a rotational axis direction of the second rotation member and configured to guide the recording medium to the fixing nip portion, and a supporting device configured to move the fixing unit to a first position when the unfixed toner image is fixed in the fixing nip portion and a second position farther away from the transfer portion than the first position in a state in which the supporting device supports the fixing unit, wherein the supporting device includes a moving member configured to move relative to the guide member when the fixing unit moves to the first position and the second position, wherein, when the fixing unit is at the first position, the moving member is positioned closer to the first rotation member than a virtual line connecting an end portion of the fixing nip portion where a recording medium enters and an end portion of the guide member on an upstream side in a recording medium conveyance direction when viewed in the rotation axis direction, and wherein, when the fixing unit is at the second position, the moving member is positioned such that at least one portion of the moving member is projecting toward the second rotation member relative to the virtual line.

Further features of the present disclosure will become apparent from the following description of exemplary embodiments with reference to the attached drawings.

DESCRIPTION OF THE EMBODIMENTS (Overall Configuration)

Figure 1:
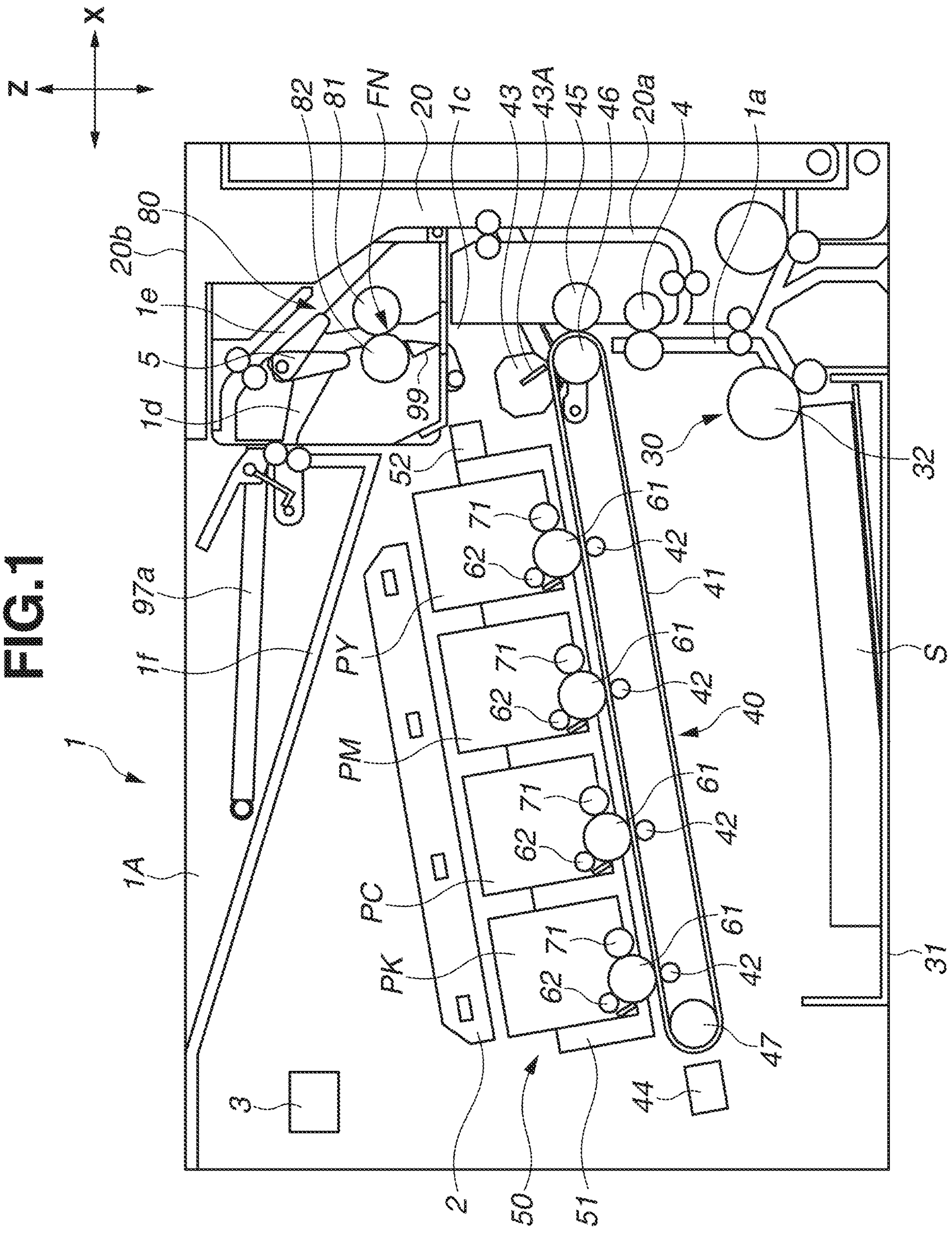
FIG. 1 is a sectional view of an image forming apparatus.

A description is given of a first exemplary embodiment. A printer 1 as an image forming apparatus is described with reference to FIG. 1. In FIG. 1, an overall configuration of the printer 1 according to the present exemplary embodiment is illustrated. The printer 1 is an electrophotographic color laser beam printer that forms a toner image on a sheet S as a recording medium.

The printer 1 includes a housing 1A, a laser scanner 2, a control unit 3, and a door (an openable and closable member) 20 that can be opened and closed with respect to the housing 1A. In addition, the printer 1 includes a sheet feed unit 30, a transfer unit 40, a tray unit (a moving unit, a supporting unit) 50, and a fixing unit 80.

The housing 1A accommodates the laser scanner 2, the control unit 3, the sheet feed unit 30, the transfer unit 40, the tray unit 50, and the fixing unit 80.

The sheet feed unit 30 includes a loading tray 31 in which sheets S are loaded, and a supply roller 32.

The loading tray 31 is pulled out in a direction of the door 20, so that the loading tray 31 can be replenished with sheets S.

The tray unit 50 includes a tray (a supporting member) 51, and cartridges PY, PM, PC, and PK. The tray 51 includes a tray handle 52. The cartridges PY, PM, PC, and PK are detachably attached to the tray 51.

Each of the cartridges PY, PM, PC, and PK is independently detachable from the tray 51. The cartridges PY, PM, PC, and PK store toners (developers) of yellow (Y), magenta (M), cyan (C), and black (K), respectively. Each of the cartridges PY, PM, PC, and PK has the same configuration except for the color of toner therein. Thus, a configuration and an operation of any one of the cartridges PY, PM, PC, and PK are described, and descriptions of configurations and operations of the other cartridges are omitted. Each of the cartridges PY, PM, PC, and PK may be called a cartridge where distinction is not necessary.

Each cartridge includes a photoconductor drum (an image bearing member) 61, a charging roller (a charging member) 62, and a development roller (a developer bearing member) 71. The photoconductor drum 61, the development roller 71, and the charging roller 62 have respective rotational axis directions that are parallel to one another.

A portion in which a black (K) toner image is formed is called a black station (a first station). The photoconductor drum 61, the development roller 71, and the charging roller 62 in the first station are respectively called a first photoconductor drum, a first development roller, and a first charging roller.

A portion in which a cyan (C) toner image is formed is called a cyan station (a second station). The photoconductor drum 61, the development roller 71, and the charging roller 62 in the second station are respectively called a second photoconductor drum, a second development roller, and a second charging roller.

A portion in which a magenta (M) toner image is formed is called a magenta station (a third station). The photoconductor drum 61, the development roller 71, and the charging roller 62 in the third station are respectively called a third photoconductor drum, a third development roller, and a third charging roller.

A portion in which a yellow (Y) toner image is formed is called a yellow station (a fourth station). The photoconductor drum 61, the development roller 71, and the charging roller 62 in the fourth station are respectively called a fourth photoconductor drum, a fourth development roller, and a fourth charging roller.

The cartridges PK, PC, PM, and PY are respectively attached to the black station, the cyan station, the magenta station, and the yellow station. The reference numerals such as first, second, third, and fourth are used for the sake of convenience in description. In the present exemplary embodiment, each of the cartridges includes the photoconductor drum 61, the charging roller 62, and the development roller 71. However, these members may be arranged in the tray 51.

The transfer unit 40 includes a belt 41, a primary transfer roller 42, a cleaning unit 43, a drive roller 46 that drives the belt 41, and a tension roller (a driven roller) 47. The printer 1 includes an optical sensor 44 for detecting a toner image that has been transferred to the belt 41. The belt 41 is disposed below the photoconductor drum 61, and the belt 41 can come into contact with the photoconductor drum 61 by the primary transfer roller 42 such that a primary transfer portion is formed between the belt 41 and the photoconductor drum 61. The printer 1 includes a secondary transfer roller 45 that comes into contact with the belt 41 such that a secondary transfer portion is formed. The secondary transfer portion is formed between the belt 41 and the secondary transfer roller 45. The primary transfer roller 42, the drive roller 46, the tension roller 47, and the secondary transfer roller 45 have respective rotational axis directions that are parallel to one another. A registration roller pair 4 is disposed below the secondary transfer portion. In the printer 1 according to the present exemplary embodiment, components including the laser scanner 2, the first through fourth stations, the belt 41, the primary transfer roller 42, and the secondary transfer roller 45 correspond to an image forming unit, and the secondary transfer portion corresponds to a transfer portion in which an unfixed toner image is transferred to a sheet S.

The fixing unit 80 fixes an unfixed toner image formed on a sheet S onto the sheet S in a fixing nip portion FN. The fixing unit 80 includes a heat roller (a first rotation member) 82 and a pressure roller (a second rotation member) 81. The unfixed toner image formed on the sheet S comes into contact with the heat roller 82. The pressure roller 81 comes into contact with an outer circumference of the heat roller 82 to form the fixing nip portion FN between the pressure roller 81 and the heat roller 82. In addition, the fixing unit 80 includes a guide member 99 that is disposed closer to the heat roller 82 than the pressure roller 81 as viewed in a rotational axis direction of the pressure roller 81. The guide member 99 guides the sheet S to the fixing nip portion FN. The guide member 99 is made of resin. The fixing unit 80 is at a first position illustrated in FIG. 1 when the unfixed toner image is to be fixed in the fixing nip portion FN.

Figure 2:
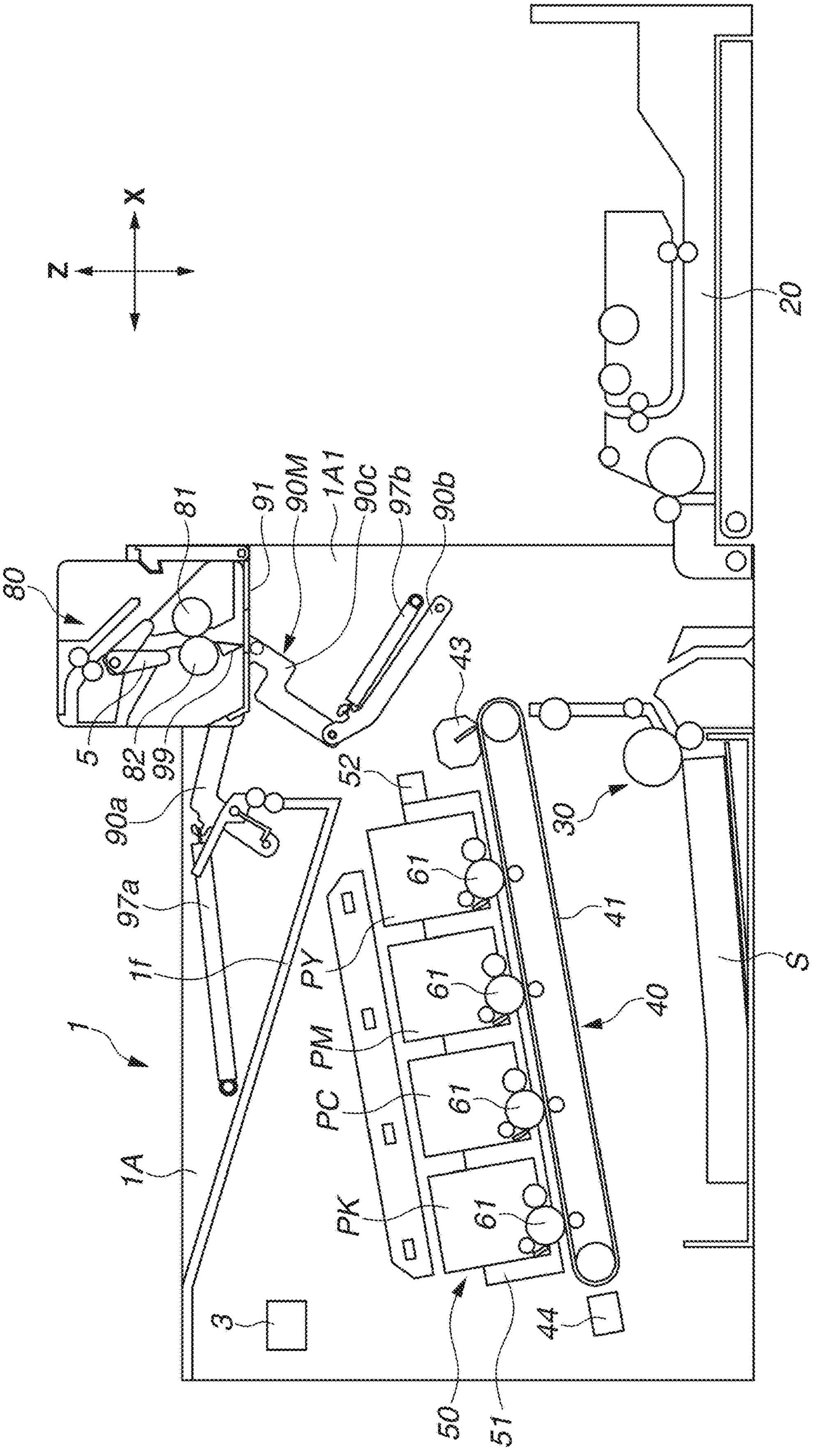
FIG. 2 is a sectional view of the image forming apparatus in a state in which a fixing unit is moved to a second position.

A description is given of the movement of the transfer unit 40 and the tray unit 50 with reference to FIGS. 1 and 2. FIG. 2 is a sectional view illustrating a state in which the door 20 is opened and the fixing unit 80 is retracted and moved to a second position.

The transfer unit 40 and the tray unit 50 are movable to the outside of the housing 1A from the inside of the housing 1A via an opening 1A1 that is provided by opening the door 20. The transfer unit 40 and the tray unit 50 move in a direction intersecting with the rotational axis direction of the photoconductor drum 61.

In a horizontal direction X, the fixing unit 80 is arranged closer to the opening 1A1 of the housing 1A. The door 20 attached to the housing 1A is rotatable between a closed position and an open position.

As illustrated in FIG. 2, in a state in which the door 20 is at the open position, the opening 1A1 is formed. As illustrated in FIG. 1, in a state in which the door 20 is at the closed position, the door 20 covers the fixing unit 80 attached to the housing 1A. More particularly, in a state in which the door 20 is at the closed position, an upper cover 20*b* of the door 20 is positioned above the fixing unit 80.

As described below, the fixing unit 80 is retractable and movable toward the opening 1A1 from the state illustrated in FIG. 1 to the state illustrated in FIG. 2. That is, the fixing unit 80 is movable to the first position at the time of fixing of an unfixed toner image in the fixing nip portion FN and the second position farther away from the transfer portion than the first position. The transfer unit 40 and the tray unit 50 are movable from positions inside the housing 1A to positions outside the housing 1A via the opening 1A1 in a state in which the door 20 and the fixing unit 80 are moved as illustrated in FIG. 2.

(Image Forming Operation)

An image forming operation of the printer 1 is described with reference to FIG. 1. The control unit 3 of the printer 1 starts an image forming operation on a sheet S based on an image signal received from an external host device such as a personal computer (PC) and an image reader.

When an image is to be formed on a sheet S, the fixing unit 80 is at the first position illustrated in FIG. 1, the tray unit 50 and the transfer unit 40 are positioned inside the housing 1A, and the door 20 is at the closed position. The belt 41 can come into contact with the photoconductor drum 61 in a state in which the transfer unit 40 is positioned inside the housing 1A.

A charging voltage is applied to the charging roller 62, and the laser scanner 2 emits a laser beam corresponding to image information to the photoconductor drum 61 in a state in which the photoconductor drum 61 is rotated, so that a surface of the photoconductor drum 61 charged by the charging roller 62 is irradiated with the laser beam. Accordingly, an electrostatic latent image corresponding to the image information is formed on the surface of the photoconductor drum 61.

A developing voltage is applied to the development roller 71 bearing toner, and the electrostatic latent image formed on the photoconductor drum 61 is developed with the toner supplied form the development roller 71. Thus, a toner image is formed on the surface of the photoconductor drum 61. When a full color toner image is to be formed, toner images of respective colors are formed on the respective photoconductor drums 61.

Each of the toner images formed on the respective photoconductor drums 61 is transferred to the belt 41 by the primary transfer roller 42 in the primary transfer portion, and the toner image transferred to the belt 41 is moved toward the secondary transfer portion formed by the belt 41 and the secondary transfer roller 45.

A conveyance path 1*c* is arranged in the housing 1A, and a sheet S being conveyed toward the fixing unit 80 passes the conveyance path 1*c*. A duplex conveyance path 20*a* is formed on the inner side of the door 20. After passing through the fixing unit 80, the sheet S passes the duplex conveyance path 20*a*. When the door 20 is opened, the conveyance path 1*c* and one portion of the duplex conveyance path 20*a* are exposed.

The sheet S loaded in the loading tray 31 is fed by the supply roller 32 at a prescribed time, and is then conveyed toward the secondary transfer portion via a sheet feeding conveyance path 1*a*. In the secondary transfer portion, the toner image on the belt 41 is transferred to the sheet S. A cleaning blade (a cleaning member) 43A disposed inside the cleaning unit 43 removes the toner which has not been transferred to the sheet S from the belt 41.

The sheet S on which the toner image has been transferred in the second transfer portion is conveyed toward the fixing unit 80. The fixing unit 80 fixes the toner image onto the sheet S. The sheet S onto which the toner image has been fixed is conveyed toward a flapper 5 serving as a conveyance path switching unit. The flapper 5 is movable to a sheet ejection position at which the sheet S having passed through the fixing unit 80 is guided toward a sheet ejection path 1*d* and a reverse position at which the sheet S having passed through the fixing unit 80 is guided toward a reverse path 1*e*.

If single-sided printing is performed, the sheet S is guided to the sheet ejection path 1*d* by the flapper 5, and is ejected to an ejection tray 1*f* arranged on an upper portion of the housing 1A. On the other hand, if duplex printing is performed, the sheet S is guided to the reverse path 1*e* by the flapper 5. After the sheet S is guided to the reverse path 1*e*, a conveyance direction of the sheet S is reversed, and the sheet S is conveyed again toward the secondary transfer portion via the duplex conveyance path 20*a* formed on the inner side of the door 20. After a toner image is transferred to a back surface of the sheet S in the second transfer portion, the sheet S passes through the fixing unit 80 again. Then, the sheet S is guided to the sheet ejection path 1*d* by the flapper 5, and is ejected to the ejection tray 1*f*.

(Supporting Configuration of Fixing Unit)

A supporting device 90M of the fixing unit 80 is described in detail with reference to FIGS. 2 and 6A. The supporting device 90M can move the fixing unit 80 to a first position (a position illustrated in FIG. 1) when an unfixed toner image is fixed in the fixing nip portion FN and to a second position (a position illustrated in FIG. 2) farther away from the transfer portion than the first position in a state in which the supporting device 90M supports the fixing unit 80.

The fixing unit 80 is attached to an attachment unit 91 that supports the bottom of the fixing unit 80. The attachment unit 91 is connected to two supporting members 90*c* disposed on one end and the other end of the printer 1 in a Y-axis direction (a rotational axis direction of the pressure roller 81). The two supporting members 90*c* are connected to respective supporting members 90*a* and respective supporting members 90*b*. A lift spring 97*a* is disposed on each of the two supporting members 90*a*, and a lift spring 97*b* is disposed on each of the two supporting members 90*b*. The lift springs 97*a* and the lift springs 97*b* urge the fixing unit 80 toward a lifting direction in which the fixing unit 80 is lifted from the first position to the second position.

Figure 3:
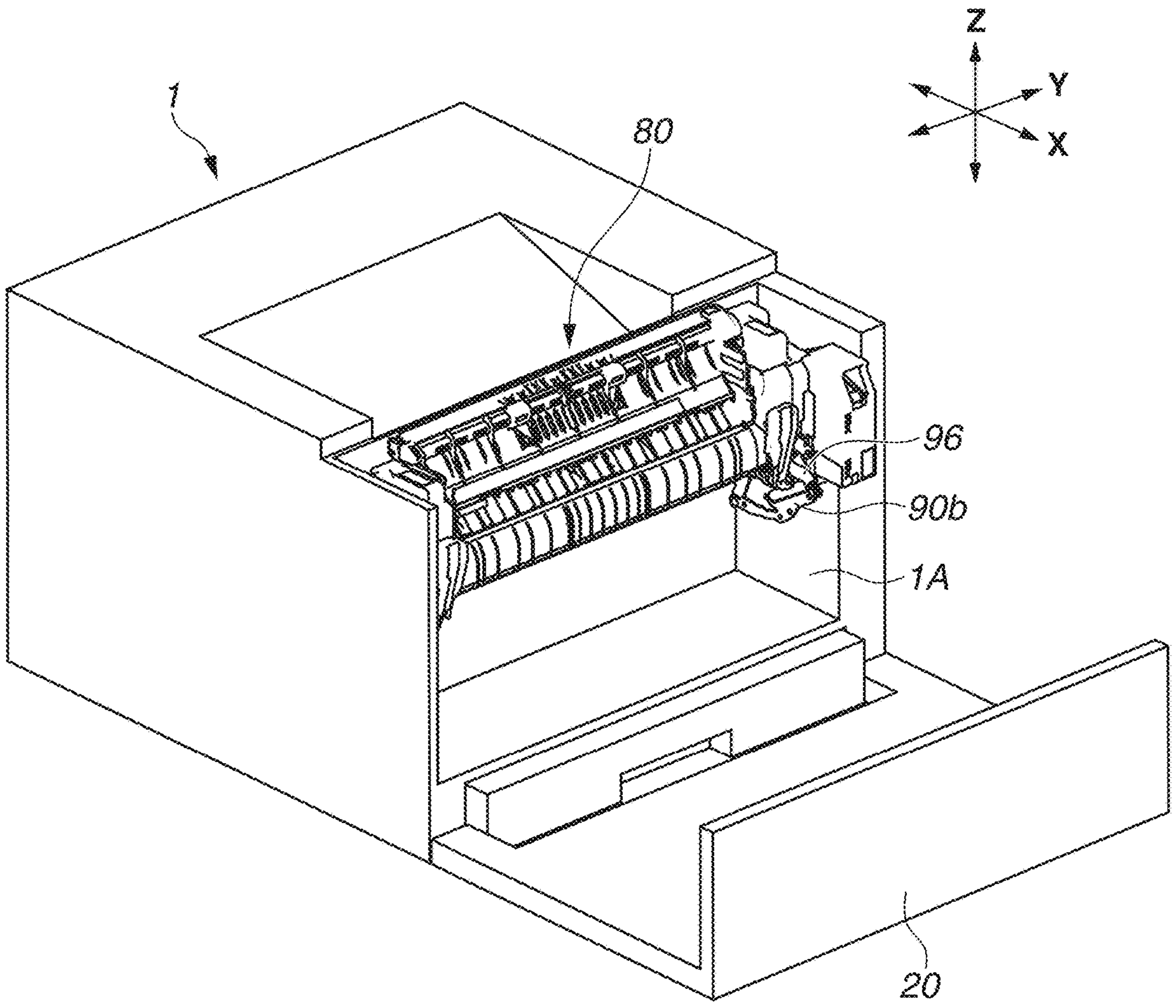
FIG. 3 is a perspective view of the image forming apparatus in a state in which a door of the image forming apparatus is opened.
Figure 4:
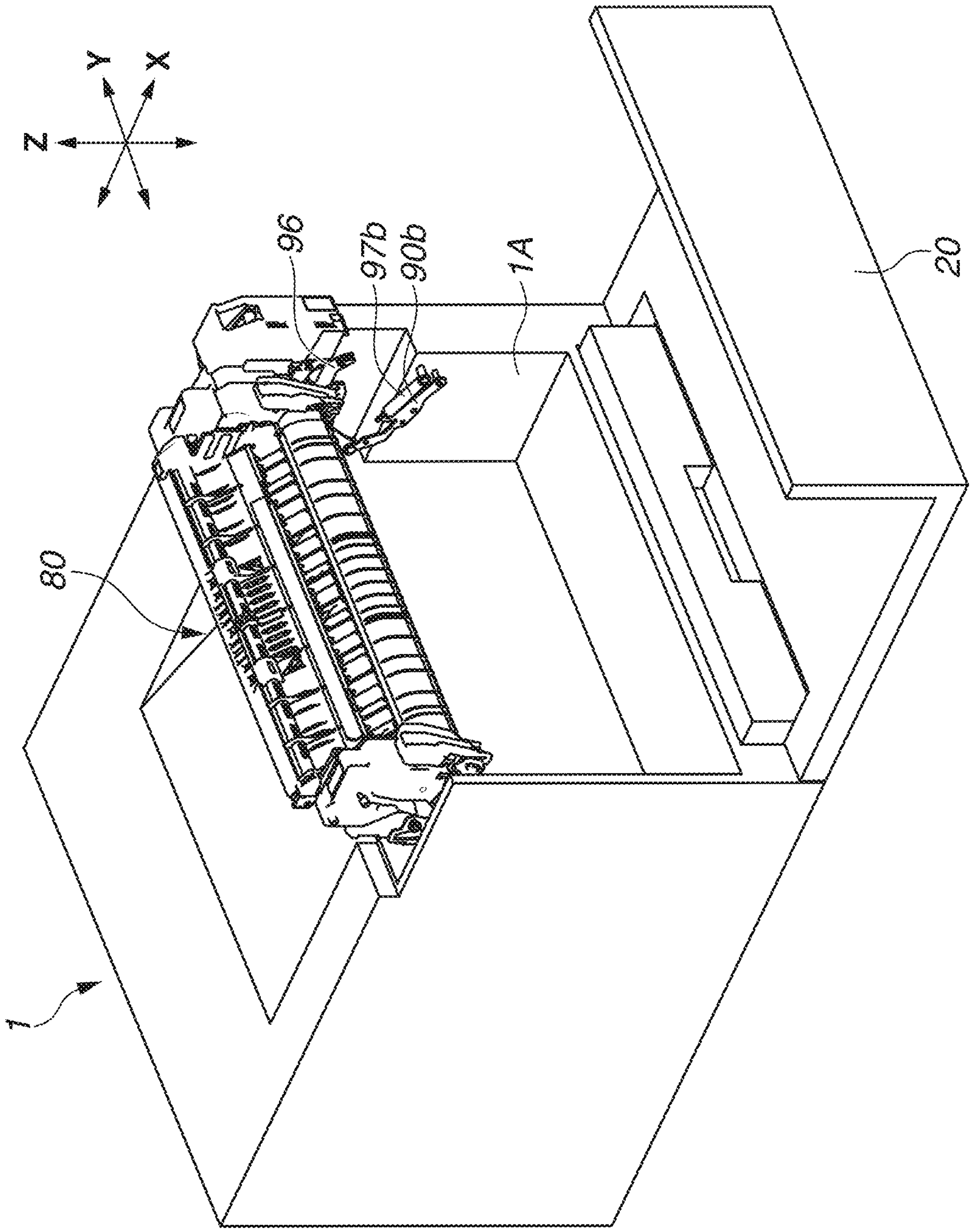
FIG. 4 is a perspective view of the image forming apparatus in a state in which the fixing unit is moved to the second position.

Each of FIGS. 3 and 4 is a perspective view illustrating a state in which the door 20 of the printer 1 is opened. A release lever 96 releases a latch for the movement of the fixing unit 80. When the release lever 96 is pushed, the fixing unit 80 attached to the attachment unit 91 is moved from a position illustrated in FIG. 3 to a position illustrated in FIG. 4 by forces of the lift springs 97*a* and 97*b* without a force applied by a user while the fixing unit 80 remains attached to the attachment unit 91. The position of the fixing unit 80 illustrated in FIG. 3 represents the first position, whereas the position of the fixing unit 80 illustrated in FIG. 4 represents the second position.

(Configuration of Retraction Guide Member)

Figure 5:
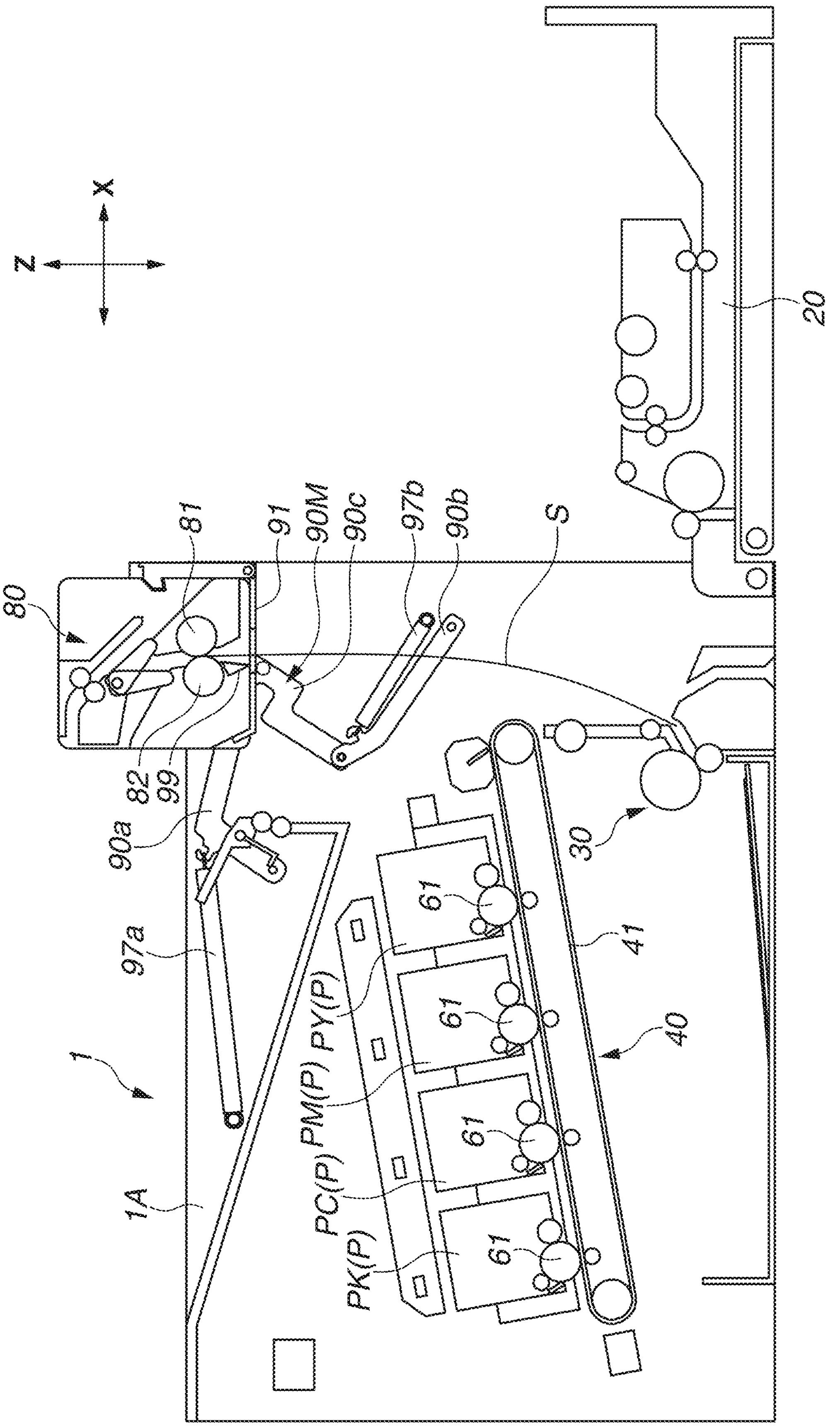
FIG. 5 is a sectional view illustrating a state in which the fixing unit is moved to the second position with a recording medium being stuck in a fixing nip portion.

FIG. 5 is a sectional view illustrating a state in which the fixing unit 80 is moved to the second position with a sheet S being stuck in the fixing nip portion FN due to a sheet jam. In a case where a user attempts to remove such a jammed sheet S as illustrated in FIG. 5, it is conceivable that the sheet S may accidentally come into contact with the guide member 99 of the fixing unit 80 and the guide member 99 may be soiled with unfixed toner on the sheet S. In a case where the printing is resumed in a state in which the guide member 99 remains soiled, a leading end of a sheet S is soiled.

The supporting device 90M includes a retraction guide member (a moving member) 98 that moves relative to the guide member 99 when the fixing unit 80 is moved to the first position and the second position. The retraction guide member 98 has a function of preventing the guide member 99 at the second position from being soiled with toner.

Figure 6A:
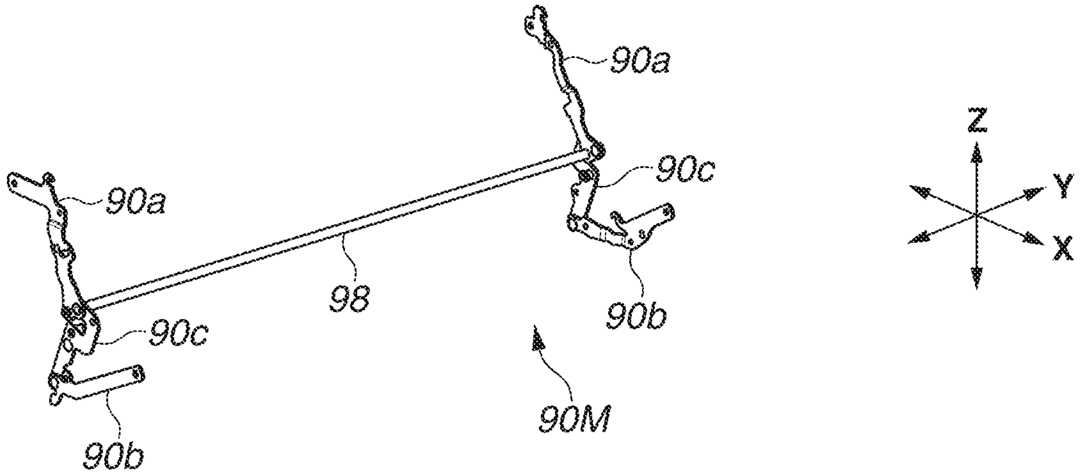
FIGS. 6A and 6B are perspective views each illustrating a retraction guide member.
Figure 6B:
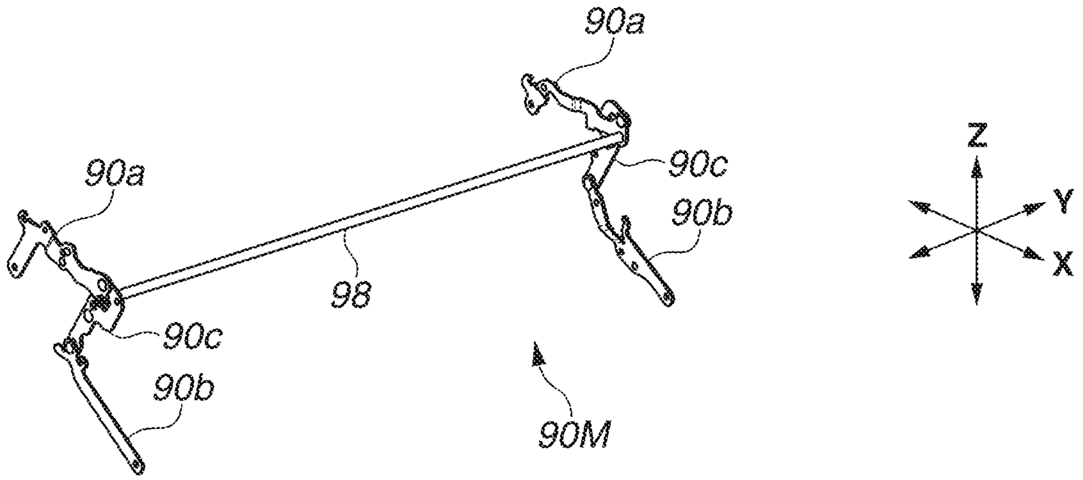

FIGS. 6A and 6B are perspective views each illustrating a configuration of the retraction guide member 98. FIG. 6A illustrates a state in which the fixing unit 80 is at the first position, whereas FIG. 6B illustrates a state in which the fixing unit 80 is at the second position. The retraction guide member 98 is a metal rod. The retraction guide member 98 is attached to the two supporting members 90*a* such that the two supporting members 90*a* are connected. A length of the retraction guide member 98 in a Y-axis direction is greater than or equal to a maximum width of a recording medium that can be used in the printer 1.

When moving from the first position illustrated in FIG. 6A to the second position illustrated in FIG. 6B, the retraction guide member 98 not only moves in a vertical direction (a Z-axis direction) but also moves in a horizontal direction (an X-axis direction).

Figure 7:
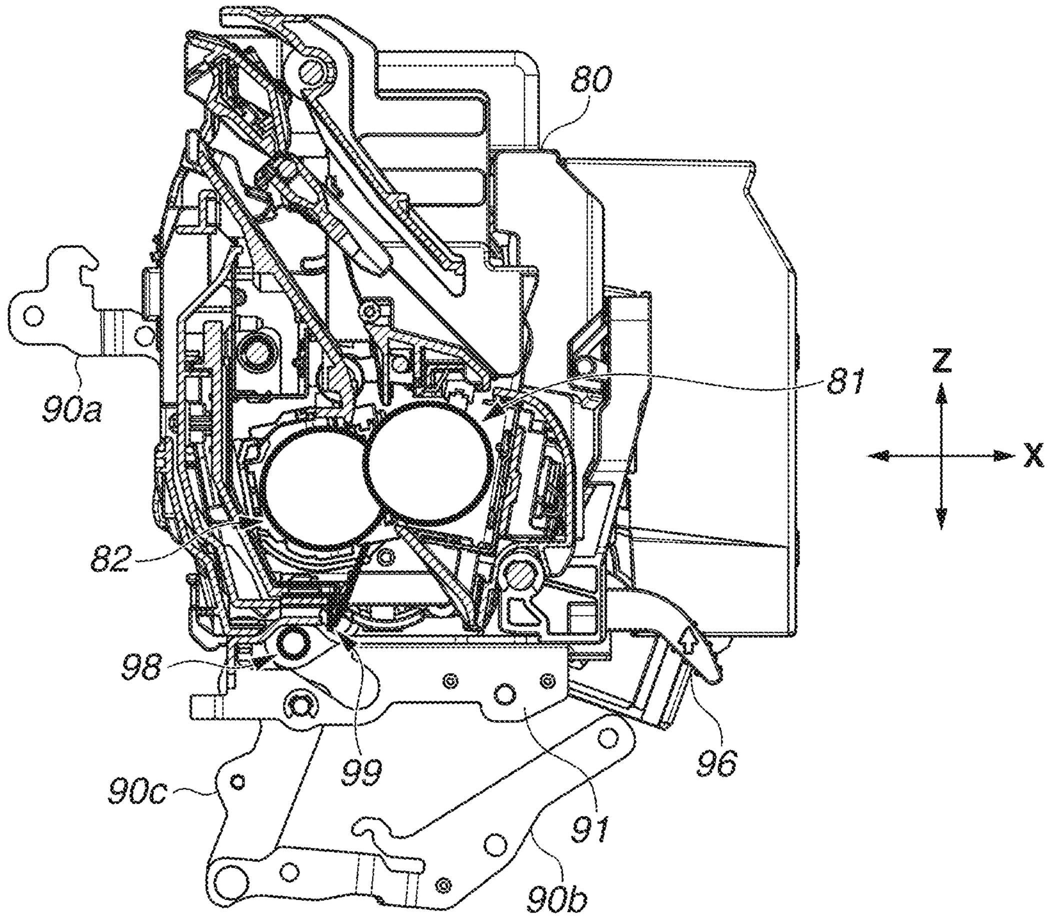
FIG. 7 is a sectional view of the fixing unit at a first position.
Figure 8:
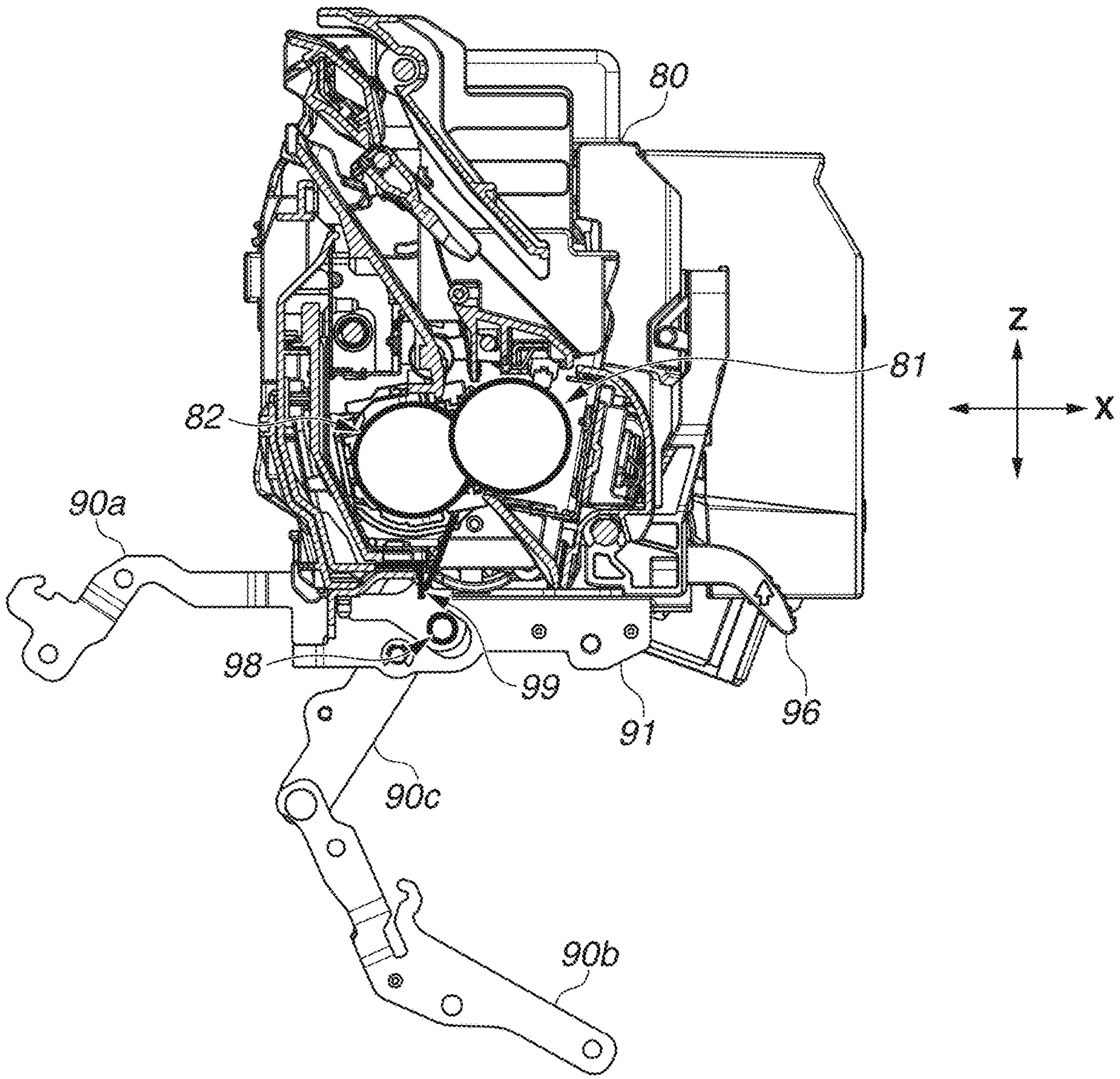
FIG. 8 is a sectional view of the fixing unit at the second position.

FIGS. 7 and 8 are sectional views each illustrating a positional relation between the retraction guide member 98 and the fixing unit 80 (the guide member 99 of the fixing unit 80). FIG. 7 illustrates a state in which the fixing unit 80 at the first position, whereas FIG. 8 illustrates a state in which the fixing unit 80 is at the second position. The fixing unit 80 attached to the attachment unit 91 is connected to the supporting members 90*c*, whereas the retraction guide member 98 is connected to the supporting members 90*a*. Accordingly, relative positions of the retraction guide member 98 and the fixing unit 80 (the guide member 99 of the fixing unit 80) differ between when the fixing unit 80 is at the first position illustrated in FIG. 7 and when the fixing unit 80 is at the second position illustrated in FIG. 8. Thus, relative positions of the retraction guide member 98 and the guide member 99 attached to the fixing unit 80 also differ between when the fixing unit 80 is at the first position and when the fixing unit 80 is at the second position.

Figure 9:
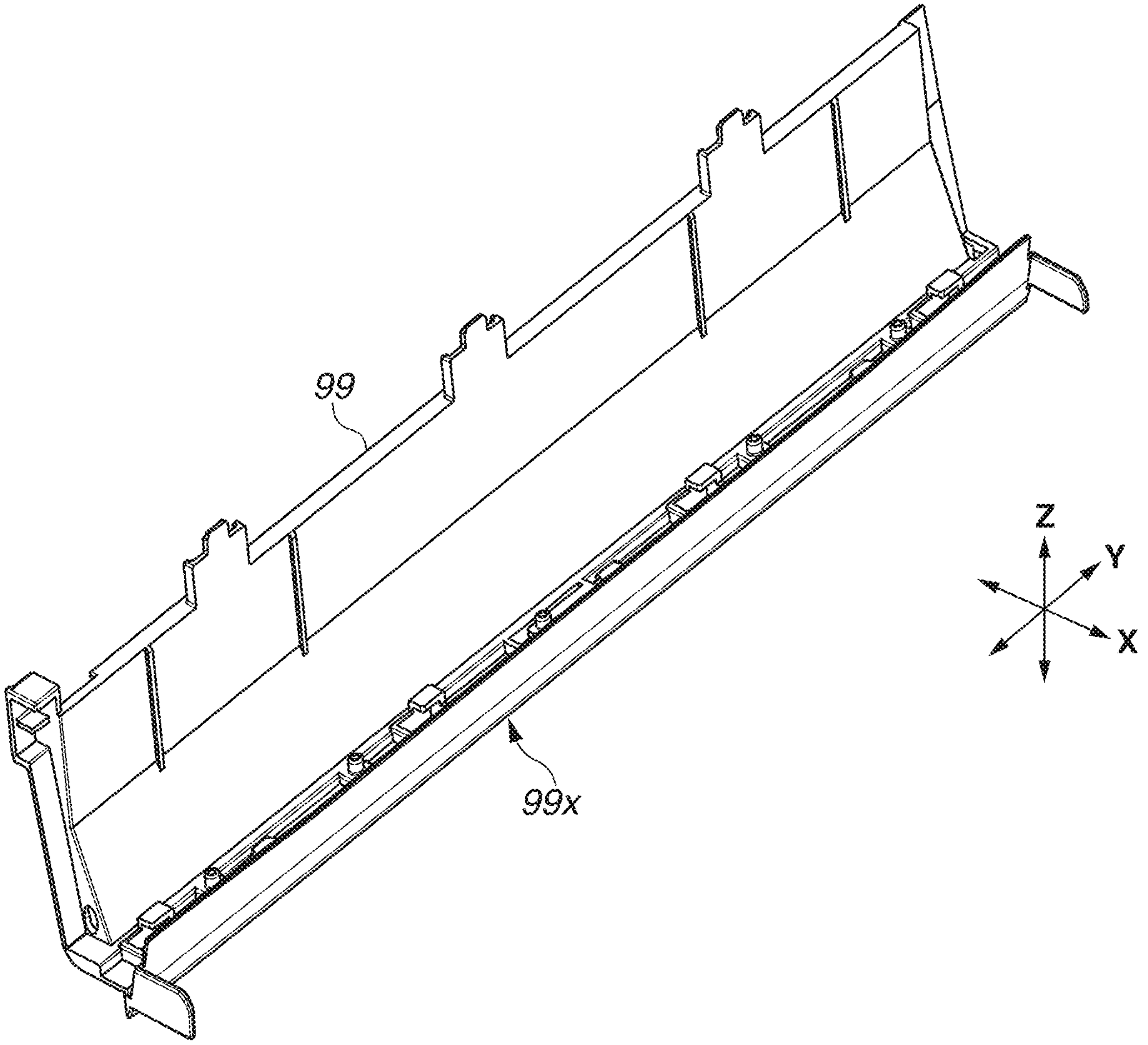
FIG. 9 is a perspective view of a guide member.
Figure 10:
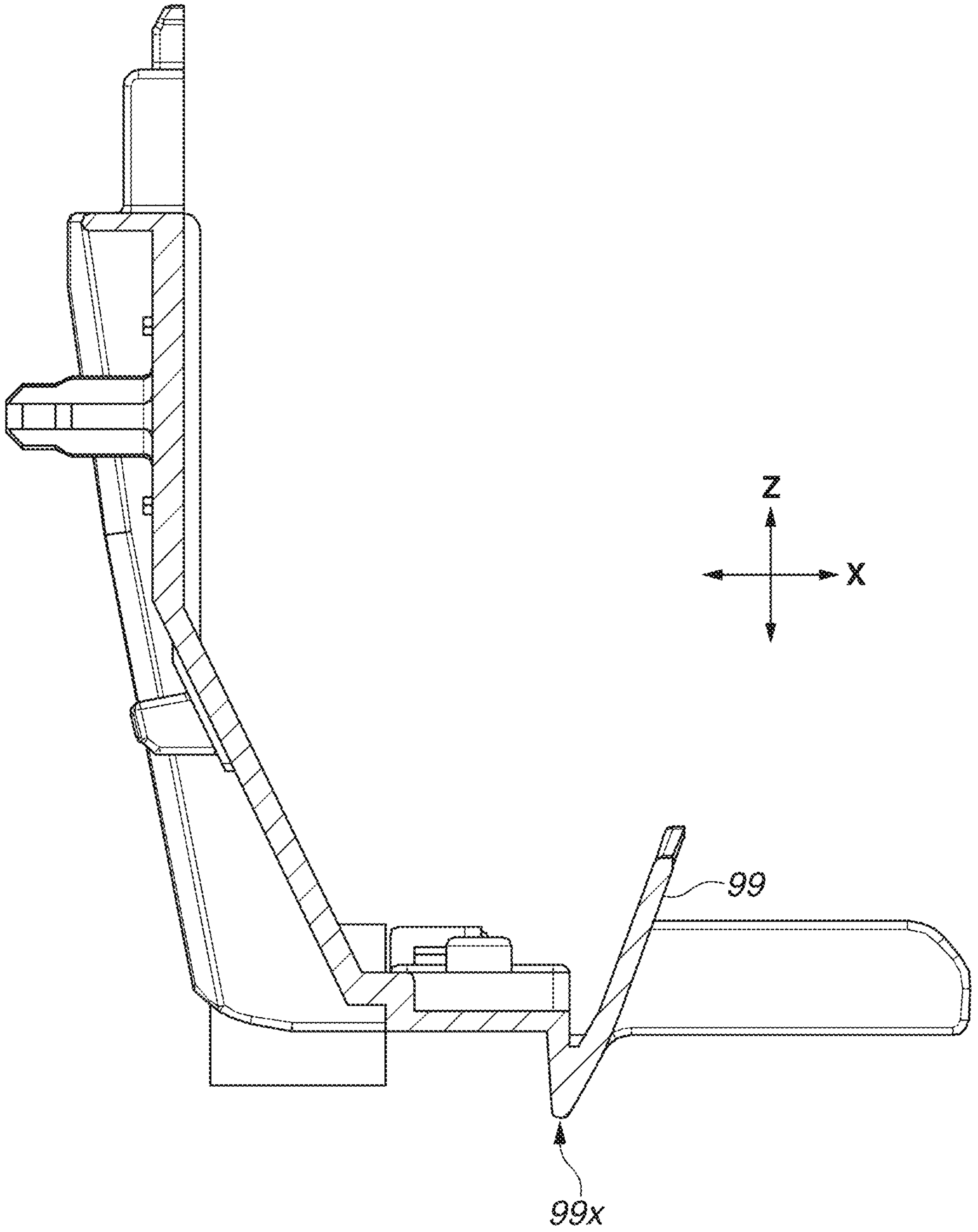
FIG. 10 is a sectional view of the guide member.
Figure 11A:
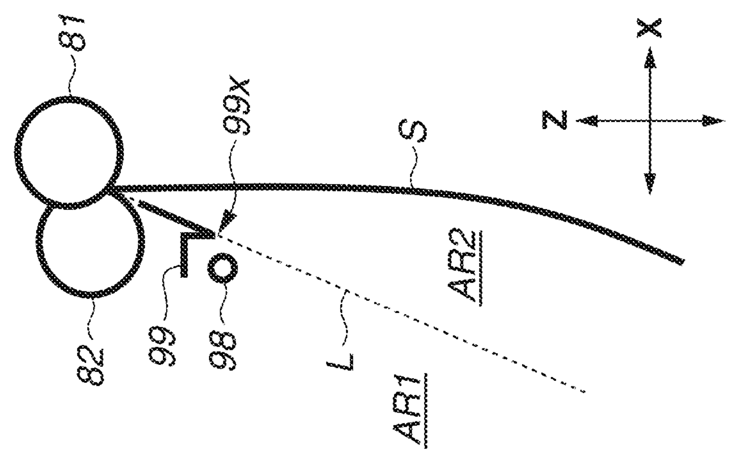
FIGS. 11A, 11B, and 11C are diagrams illustrating comparisons of positions of the retraction guide members.
Figure 11B:
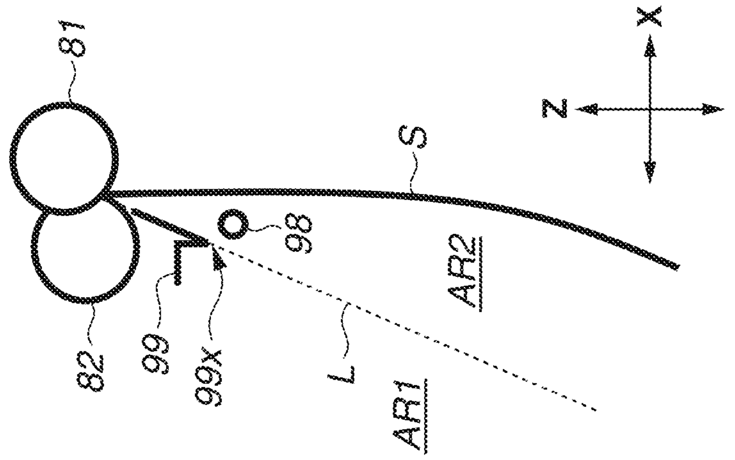
Figure 11C:
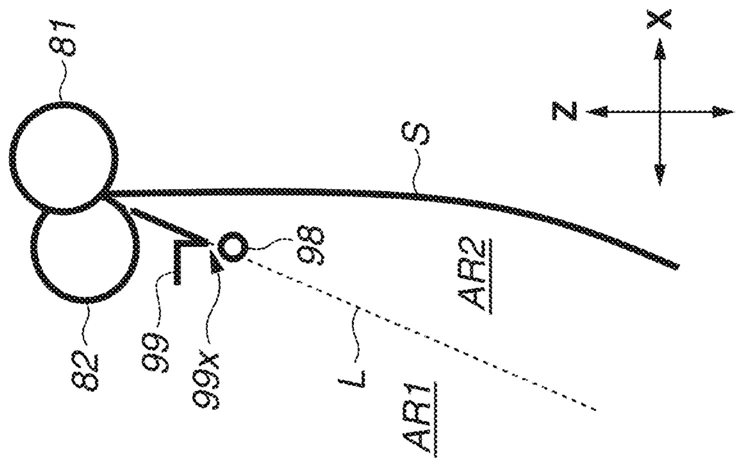

FIG. 9 is a perspective view of the guide member 99, and FIG. 10 is a sectional view of the guide member 99. Each of FIGS. 11A through 11C is a diagram in which a position of a sheet S is added to extraction of positions of the heat roller 82, the pressure roller 81, the guide member 99, and the retraction guide member 98 from FIGS. 7 and 8. FIG. 11A illustrates a state of the first position, and FIG. 11B illustrates a state of the second position. In each of FIGS. 11A through 11C, a line L is a virtual line connecting an end portion of the fixing nip portion FN where a recording medium enters and an end portion 99X of the guide member 99 on an upstream side in a recording medium conveyance direction when viewed in a Y direction.

When the fixing unit 80 is at the first position, the retraction guide member 98 is positioned in an area AR1 closer to the heat roller 82 than the virtual line L. When the fixing unit 80 is at the second position, the retraction guide member 98 is at a position where the retraction guide member 98 is projecting toward an area AR2 closer to the pressure roller 81 than the virtual line L.

Accordingly, in the state illustrated in FIG. 11B, even in a case where a user moves the sheet S in an X-axis direction to remove the sheet S, the retraction guide member 98 can prevent unfixed toner on the sheet S from coming into contact with the guide member 99.

In the present exemplary embodiment, when the fixing unit 80 is at the second position, the retraction guide member 98 as a whole projects toward the area AR2 closer to the pressure roller 81. However, as illustrated in FIG. 11C, when the fixing unit 80 is at the second position, the retraction guide member 98 can be arranged such that at least one portion of the retraction guide member 98 is projecting toward the area AR2 closer to the pressure roller 81 than the virtual line L.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of priority from Japanese Patent Application No. 2024-053305, filed Mar. 28, 2024, which is hereby incorporated by reference herein in its entirety.

What is claimed is:

1. An image forming apparatus comprising:

an image forming unit including a transfer portion in which an unfixed toner image is transferred to a recording medium;

a fixing unit configured to fix the unfixed toner image formed on the recording medium onto the recording medium in a fixing nip portion, the fixing unit including:

a first rotation member that comes into contact with the unfixed toner image formed on the recording medium;

a second rotation member that comes into contact with an outer circumference of the first rotation member to form the fixing nip portion between the first rotation member and the second rotation member; and a guide member disposed closer to the first rotation member than the second rotation member when viewed in a rotational axis direction of the second rotation member and configured to guide the recording medium to the fixing nip portion; and a supporting device configured to move the fixing unit to a first position when the unfixed toner image is fixed in the fixing nip portion and a second position farther away from the transfer portion than the first position in a state in which the supporting device supports the fixing unit, wherein the supporting device includes a moving member configured to move relative to the guide member when the fixing unit moves to the first position and the second position, wherein, when the fixing unit is at the first position, the moving member is positioned closer to the first rotation member than a virtual line connecting an end portion of the fixing nip portion where a recording medium enters and an end portion of the guide member on an upstream side in a recording medium conveyance direction when viewed in the rotation axis direction, and wherein, when the fixing unit is at the second position, the moving member is positioned such that at least one portion of the moving member is projecting toward the second rotation member relative to the virtual line.

2. The image forming apparatus according to claim 1, wherein, when the fixing unit is at the second position, the moving member is positioned such that the moving member as a whole is projecting toward the side close to the second rotation member relative to the virtual line.

3. The image forming apparatus according to claim 1, wherein a length of the moving member in the rotational axis direction is greater than or equal to a maximum width of a recording medium usable in the image forming apparatus.

4. The image forming apparatus according to claim 1, wherein the supporting device includes two supporting members disposed on one end and another end of the image forming apparatus in the rotational axis direction, and the moving member is attached to the two supporting members such that the two supporting members are connected.

5. The image forming apparatus according to claim 4, wherein the moving member is a metal rod.

* * * * *